United States Patent [19]
Björklund et al.

[11] Patent Number: 5,701,239
[45] Date of Patent: Dec. 23, 1997

[54] HIGH-VOLTAGE DIRECT CURRENT TRANSMISSION INSTALLATION HAVING A HIGH VOLTAGE REGULATION CAPABILITY

[75] Inventors: Per-Erik Björklund, Bjursås; Tomas Jonsson, Grängesberg; Lars-Erik Juhlin, Ludvika, all of Sweden

[73] Assignee: Asea Brown Boveri AB, Västerås, Sweden

[21] Appl. No.: 598,389

[22] Filed: Feb. 8, 1996

[30] Foreign Application Priority Data

Feb. 10, 1995 [SE] Sweden .................. 9500480-0

[51] Int. Cl.$^6$ .............. H02J 3/36; H02M 5/45; H02M 3/24
[52] U.S. Cl. .................. 363/35; 363/37; 363/95
[58] Field of Search .................. 363/34, 35, 37, 363/95, 96

[56] References Cited

U.S. PATENT DOCUMENTS

| | | |
|---|---|---|
| 4,264,951 | 4/1981 | Konishi et al. .................. 363/35 |
| 4,330,815 | 5/1982 | Konishi . | |
| 4,517,634 | 5/1985 | Sakai .................. 363/35 |
| 4,680,692 | 7/1987 | Sakai .................. 363/35 |
| 4,888,674 | 12/1989 | Weibelzahl et al. . | |
| 5,182,702 | 1/1993 | Hiramatsu et al. .................. 363/37 |
| 5,396,411 | 3/1995 | Konishi et al. .................. 363/35 |
| 5,535,113 | 7/1996 | Konishi .................. 363/35 |

FOREIGN PATENT DOCUMENTS 0 067 978   5/1982   European Pat. Off. .
WO 92/22118   12/1992   WIPO .

OTHER PUBLICATIONS

*High Voltage Direct Current Transmission*, Peter Peregrinus Ltd., London, 1983 (Index).
*High Power Electronics, HVDC and SVC*, The Royal Institute of Technology, Stockholm, 1990 (Index).
*Power Transmission By Direct Current*, Springer-Verlag Berlin-Heidelberg-New York 1975 (Index).

Primary Examiner—Peter S. Wong
Assistant Examiner—Bao Vu
Attorney, Agent, or Firm—Pollock, Vande Sande & Priddy

[57] ABSTRACT

An installation for transmission of electric power by means of high-voltage direct current has two converters (SRI, SRII), each of which is connected to an alternating-voltage network (NI, NII) and which are connected to each other through a dc connection (L). One converter (SRI) is controlled as a rectifier and another converter (SRII) is controlled as an inverter. One converter (SRI) is current-controlling and another converter (SRII) is voltage-controlling. The installation has means (VARC$_{rect}$) adapted, at such a change of the control angle ($\alpha_{rect}$) of the current-controlling converter (SRI) that the angle reaches a limit of a predetermined interval ($\alpha_{max\ nom\ rect}-\alpha_{min\ nom\ rect}$) to control, by means of the voltage-controlling converter (SRII), the direct voltage (Ud) of the transmission in such a way that said change is limited.

10 Claims, 13 Drawing Sheets

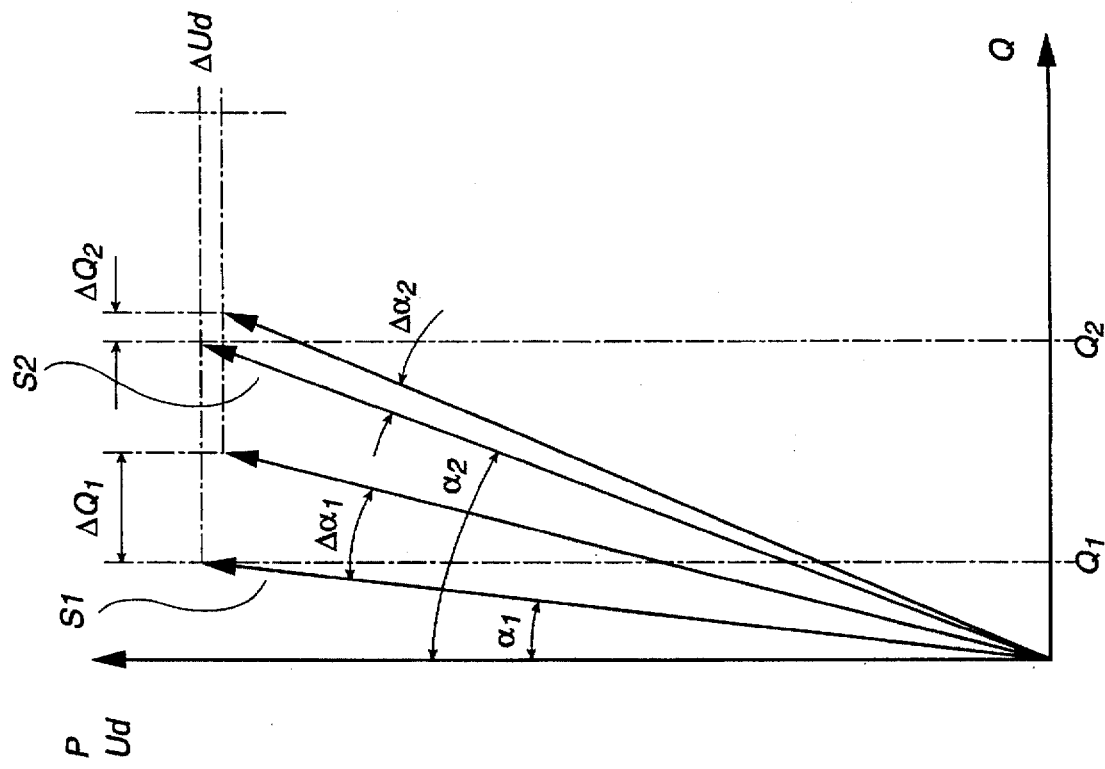

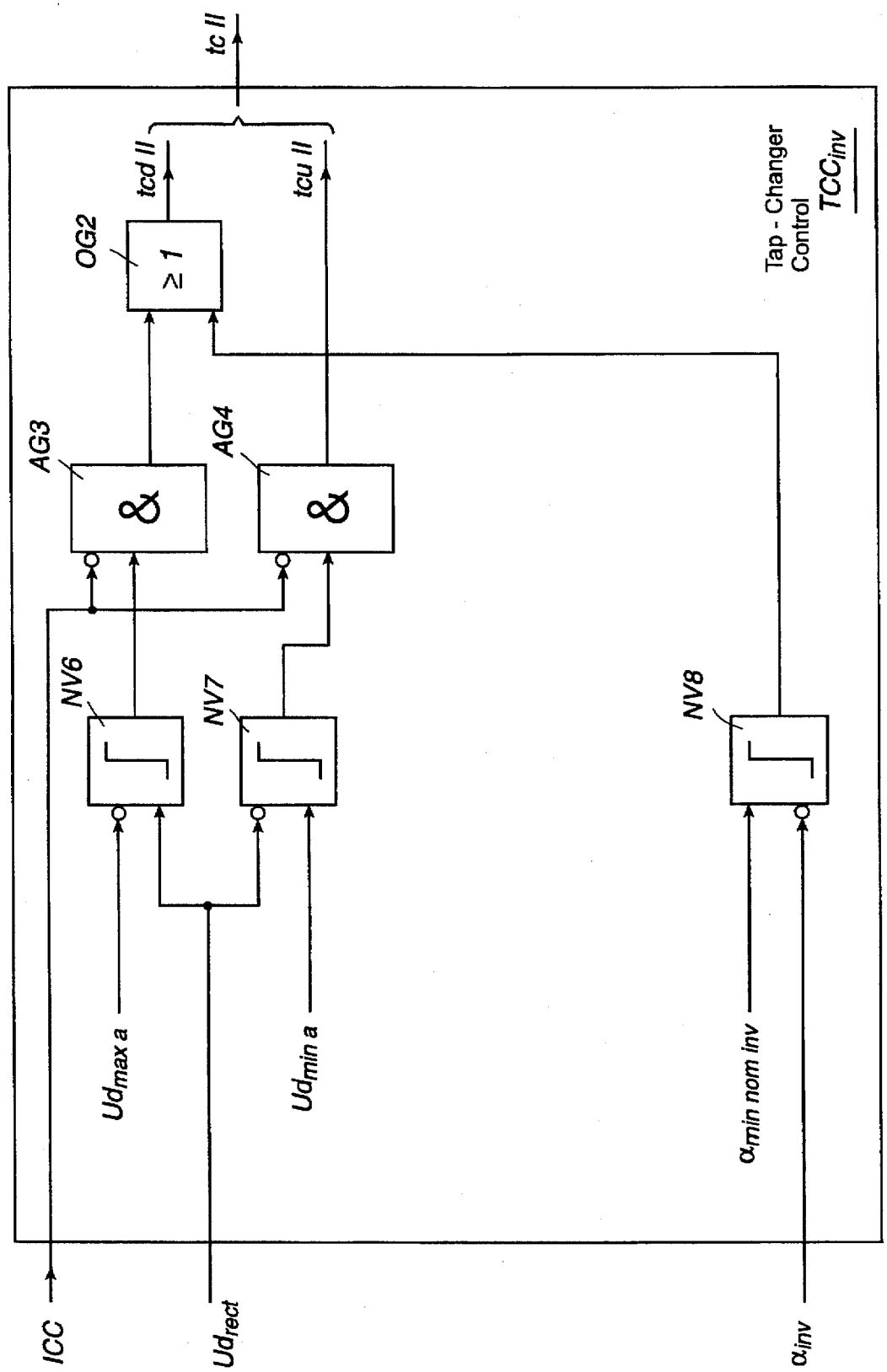

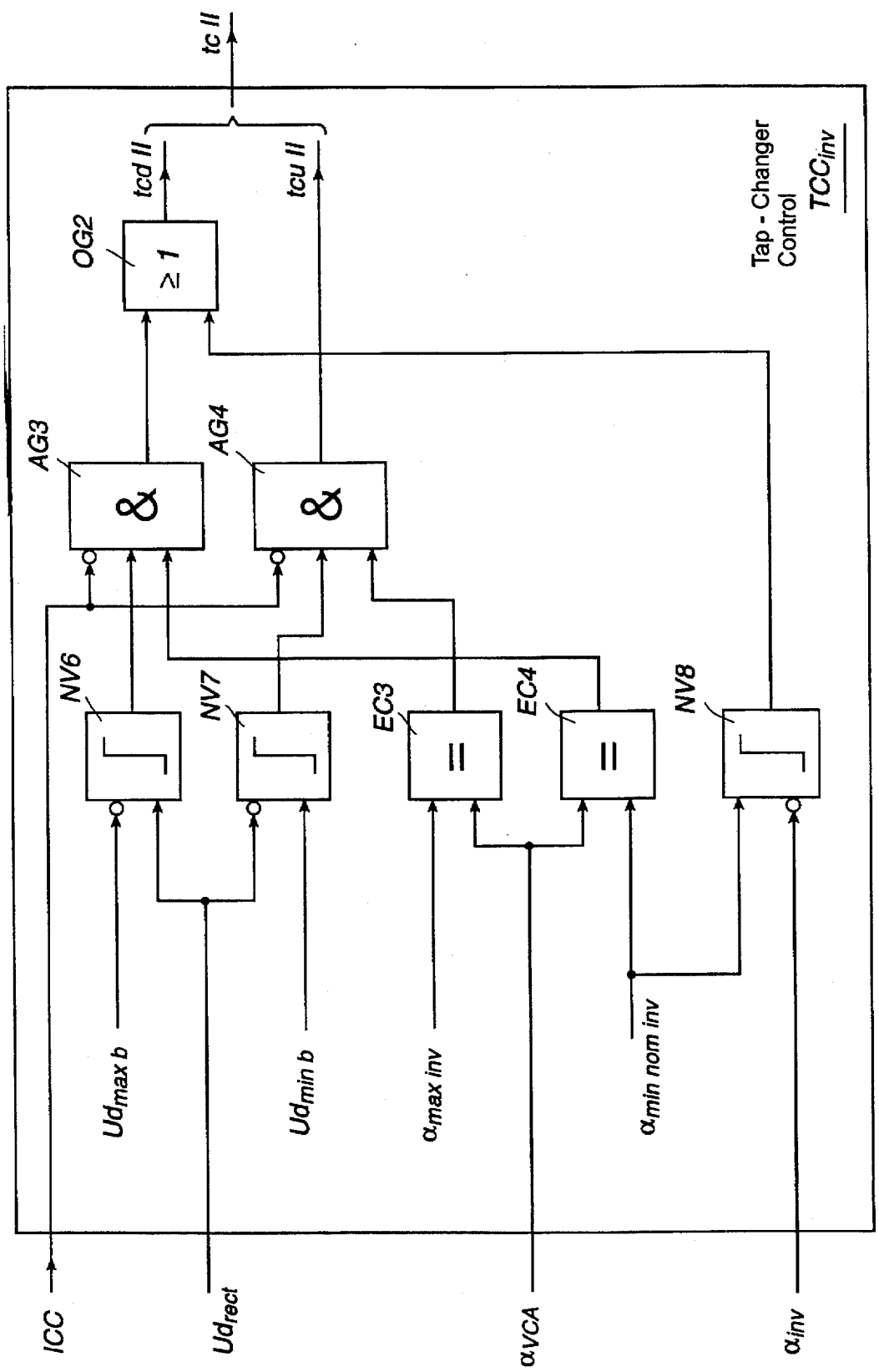

HIGH-VOLTAGE DIRECT CURRENT TRANSMISSION INSTALLATION HAVING A HIGH VOLTAGE REGULATION CAPABILITY

TECHNICAL FIELD

The present invention relates to an installation for transmission of electric power by means of high-voltage direct current. The installation comprises two phase-angle controlled converters, each of which is connected to an alternating-voltage network and connected to each other by a dc connection.

Control members are adapted to control one of the converters to operate as a rectifier and to control another converter to operate as an inverter.

The control members are also adapted to control one converter, the current-controlling converter for control of the direct current flowing in the dc connection, and to control another converter, the voltage-controlling converter, for control of the direct voltage in the dc connection.

BACKGROUND ART

Installations of the above-mentioned kind are previously well known and described through, for example, Erich Uhlmann: "Power Transmission by Direct Current", Springer-Verlag Berlin-Heidelberg-New York 1975, Åke Ekström: "High Power Electronics, HVDC and SVC, The Royal Institute of Technology, Stockholm, 1990, J. Arrilaga: "High Voltage Direct Current Transmission", Peter Peregrinus Ltd., London, 1983.

In an installation of the above kind, each of the two converters is normally arranged in its own converter station, which are located at a distance from each other and interconnected through a dc-carrying cable and/or an overhead line. In certain case—in case of so-called back-to-back connections—the converters may be arranged in the same converter station, and the dc connection then consists of dc busbars in the station.

Usually, the converters are 12-pulse converters and each one consists of two series-connected six-pulse bridges with associated transformers as well as control and protective equipment.

An installation of the kind referred to here may be monopolar, that is, with one single dc line and with return of the direct current through ground, or bipolar, that is, with two converters in each station, and with two dc lines, one with positive voltage relative to ground and the other with negative voltage relative to ground.

In installations of the above-mentioned kind, one of the converters is operating as a rectifier and the other as an inverter. The converters are then controlled such that one of the converters is current-controlling and the other is voltage-controlling. Usually, the rectifier is current-controlling, that is, it operates at a somewhat reduced dc voltage and with a control angle $\alpha$ which is influenced by a current controller such that the direct current is controlled towards a current reference value. The inverter is then the voltage-controlling converter. Its control angle is maintained at such a value that the converter operates at a minimum value of the extinction angle $\gamma$. The inverter then determines the direct voltage in the transmission, and this direct voltage may be controlled with the aid of the tap changer of the inverter transformer such that the direct voltage, for example at the rectifier, is maintained at a voltage reference value.

In these known installations, the control angle of the rectifier has a nominal value of, for example, 15°, and the tap changer of the rectifier transformer is controlled such that the control angle of the rectifier is maintained within a predetermined interval. This is determined, for example, such that, in case of a change of the control angle from the nominal value to the lower or upper limit of the interval, the change of the direct voltage caused by the change of the control angle is ± 1 tap-changer step. The limits of the control-angle interval are typically 12.5° and 17.5° at the above-mentioned nominal control-angle value 15°. A tap-changer step typically corresponds to a voltage change of 1.25% of the nominal operating voltage.

The reactive-power consumption of a converter increases rapidly with the control angle and is approximately proportional to sin $\alpha$. In these known installations, therefore, the reactive-power consumption of the rectifier is relatively high.

There is, therefore, a desire to be able to operate with lower control angles of the rectifier, but in most cases, for various reasons, this has not previously been possible in practice. In certain types of converters, however, it has proved to be possible to operate with low control angles (the control angles are assumed to be related to the line voltage). This has especially proved to be the case in so-called series-compensated HVDC converters, that is, converters which are connected to their alternating-voltage networks through series capacitors. Such converters may, as rectifiers, operate with very low and even negative control angles. In this way, the reactive-power consumption may be kept low.

In series-compensated converters, however, the firing and extinction voltage jumps, that is, the sudden voltage changes across a converter valve upon firing and extinction thereof, are relatively high and increase with the control angle. In such converters, therefore, it is important to maintain the control angle low.

Operating a rectifier at low control angles, however, entails a significant drawback. This is illustrated schematically in FIG. 1 which shows the relationship between the apparent power S, the active power P (P=Scos$\alpha$) and the reactive power Q (Q=Ssin$\alpha$) of a rectifier at a certain current and at two different control angles $\alpha$1 and $\alpha$2. The direct voltage Ud of the rectifier is proportional to the active power P and is shown on the same axis as this. As mentioned above, the control angle will need to be varied within a range which is so large that the change of the control angle causes a certain given direct-voltage change $\Delta$Ud, the magnitude of which is determined by the magnitude of the tap-changer step. At the higher control angle $\alpha$2 and apparent power S2, a control-angle change $\Delta\alpha$2 is required to achieve the voltage change $\Delta$Ud. This control-angle change entails a change $\Delta$Q2 in the reactive power. At the lower control angle $\alpha$1 and the apparent power S1, a significantly larger control-angle change $\Delta\alpha$1 is required to achieve the same voltage change $\Delta$Ud, which entails a significantly larger reactive-power change $\Delta$Q1. At still lower control angles, at or in the vicinity of the control-angle values where the direct voltage has its maximum, the required control-angle changes and hence the reactive-power changes will become very large. An operation at low control angles thus entails large reactive-power variations, which may be unfavorable for certain network configurations. While it is true that these reactive-power variations, at least partially, may be counteracted by the introduction of thyristor-switched shunt capacitors, this entails a significant disadvantage from the point of view of cost. The control-angle variations, and hence the reactive-power variations, could also theoretically be reduced by a reduction of the magnitude of the steps of the tap changer. Such a reduction, however, would entail a corresponding increase of the switching frequency of the tap changer, which would entail a considerable, and in most cases unacceptable, increase of the wear of the tap changer.

What has been described above for converters operating as rectifiers is valid—mutatis mutandis—for converters operating as inverters as well. For such a converter, operation at low extinction angles (referred to the line voltage) is made possible, for example through series compensation, and in that case the above-mentioned large reactive-power variations then arise upon changes of the control angle.

SUMMARY OF THE INVENTION

The object of the invention is to provide an installation of the kind described in the introduction, in which the above-mentioned reactive-power variations during operation at low control angles (or extinction angles) are significantly reduced. The object of the invention is thus, without any need for additional components (such as thyristor-switched shunt capacitors), and only by a new method of control, to make possible operation at significantly lower control angles and with lower reactive-power variations than what has hitherto been possible, whereby, the reactive-power consumption of the converters and the magnitude of the firing and extinction voltage jumps may be significantly reduced compared with prior art control principles.

What characterizes an installation according to the invention will become clear from the appended claims.

When stepping the tap changer of, for example, the rectifier, or upon a change of the voltage in the alternating-voltage network of the rectifier, the rectifier will change its control angle to maintain the ordered direct current. In an installation according to the invention, the direct voltage of the transmission is changed such that the change in the control angle of the rectifier and hence its reactive-power variation are limited.

BRIEF DESCRIPTION OF THE DRAWINGS

The invention will be explained in greater detail in the following with reference to the accompanying FIGS. 1–7.

FIG. 1 shows, as mentioned above, the power relationships during operation with two different control angles.

FIGS. 3–7 show in more detail examples of embodiments of different units of the installations according to FIG. 2.

FIG. 3 shows the control-angle generator of the rectifier in the installations according to FIGS. 2a and 2b.

FIG. 4a shows the control unit for the reference-value generator of the rectifier in the installation according to FIG. 2a.

FIG. 7a and FIG. 7b show the control unit for the tap changer of the inverter in the installations according to FIG. 2a and FIG. 2b, respectively.

DESCRIPTION OF THE PREFERRED EMBODIMENTS

FIG. 1 has been described above.

Figure 2A:
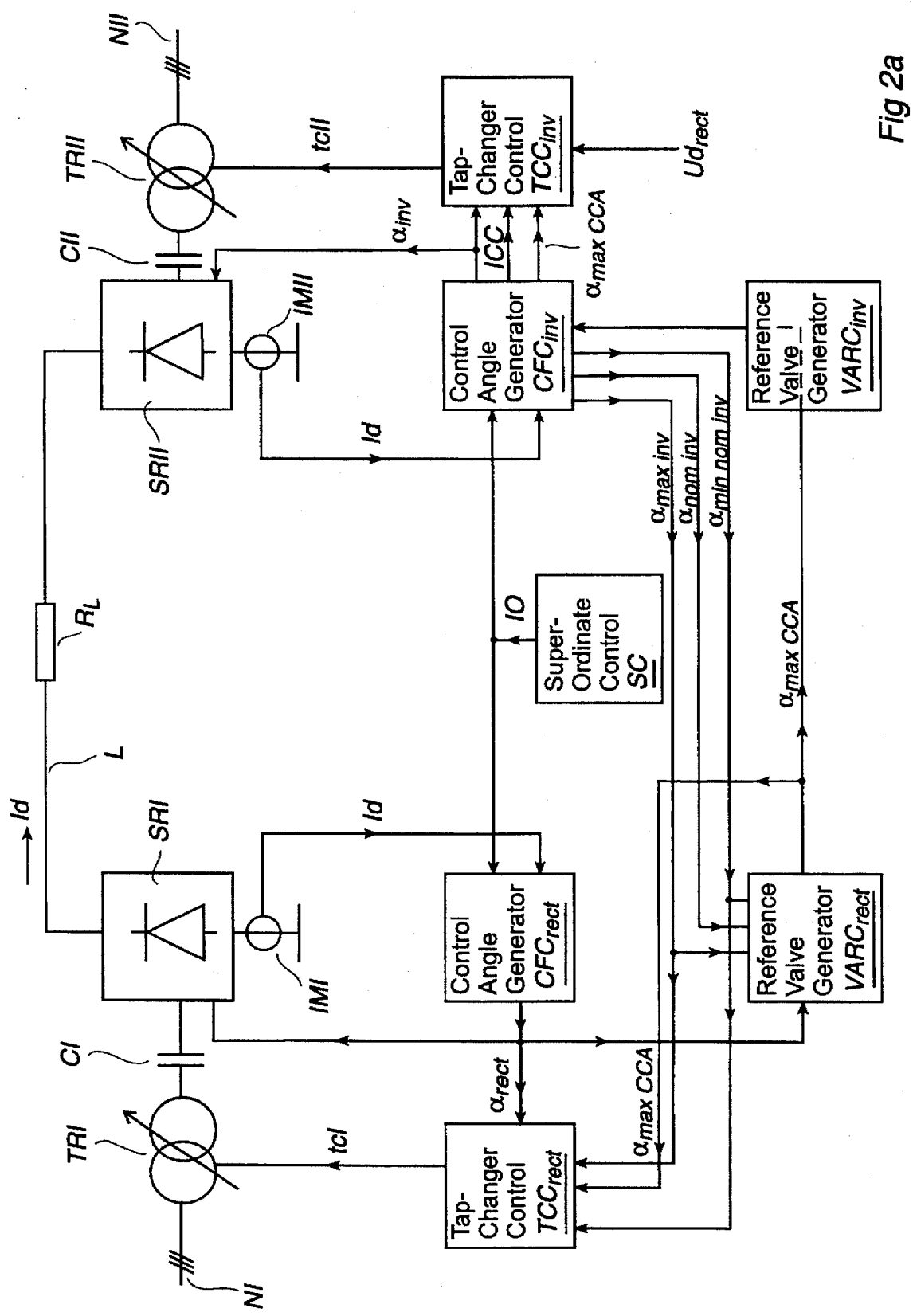
FIG. 2a shows an overall diagram of an installation according to the invention, where the control-angle variation of the rectifier is limited by supplying a control-angle increment to the control angle of the inverter.

FIG. 2a shows an example of an HVDC installation according to the invention. It is arranged for power transmission between two three-phase power networks NI and NII. A converter SRI is connected through its converter transformer TRI to the network NI, and a converter SRII is connected via its converter transformer TRII to the network NII. The transformers are provided with tap changers, which are supplied with the control signals tcI and tcII. The invention is particularly advantageous when used in series-compensated converters, since as mentioned above these may operate with very low control angles. The converters are therefore shown connected to their alternating-voltage networks through series capacitors CI and CII. These are preferably located as shown in the figure between the converter transformers and the converters, but in an installation according to the invention they may alternatively be located on the network side of the converter transformers.

The converters are connected to each other by a high-voltage line L which may consist of a cable and/or an overhead line and which has the resistance $R_L$. The direct current flowing through the line and the converters is designated Id. The converters have dc-measuring members IMI and IMII and for the sake of simplicity the same designation Id is used for the measured signals from the measurement members as for the actual direct current.

Unless otherwise stated, it is assumed in the examples described here that the most common operating case prevails, that is SRI operates as a rectifier and SRII operates as an inverter, and SRI is current-controlling and SRII is voltage-controlling, and only those parts of the control equipment of the installation which are relevant to this operating case are shown. In the usual way, however, it is assumed that the converters and their control equipment are mutually identical such that anyone of the converters can operate as a rectifier (the other converter then operating as an inverter) and anyone of the converters can be current-controlling (the other converter then being voltage-controlling).

The control equipment of each converter comprises a control-angle generator, $CFC_{rect}$ and $CFC_{inv}$; a reference-value generator, $VAR_{rect}$ and $VARC_{inv}$; and a tap-changer control device, $TCC_{rect}$ and $TCC_{inv}$. Further, there is a superordinate control unit SC which supplies a current order IO to the converters. The various parts of the control equipment are schematically shown as analog functional units, but the parts may be designed in analog or in digital technique.

Transmission of the necessary control, reference and measurement signals (e.g. $Ud_{ref}$, IO) to or between the two converter stations is performed in a known manner with the aid of a telecommunication link (not shown in greater detail).

In the installation according to FIG. 2a, a limitation of the control-angle variation is obtained, in the manner which will be described in more detail below, by supplying a control-angle increment—negative or positive—to the inverter.

Figure 2B:
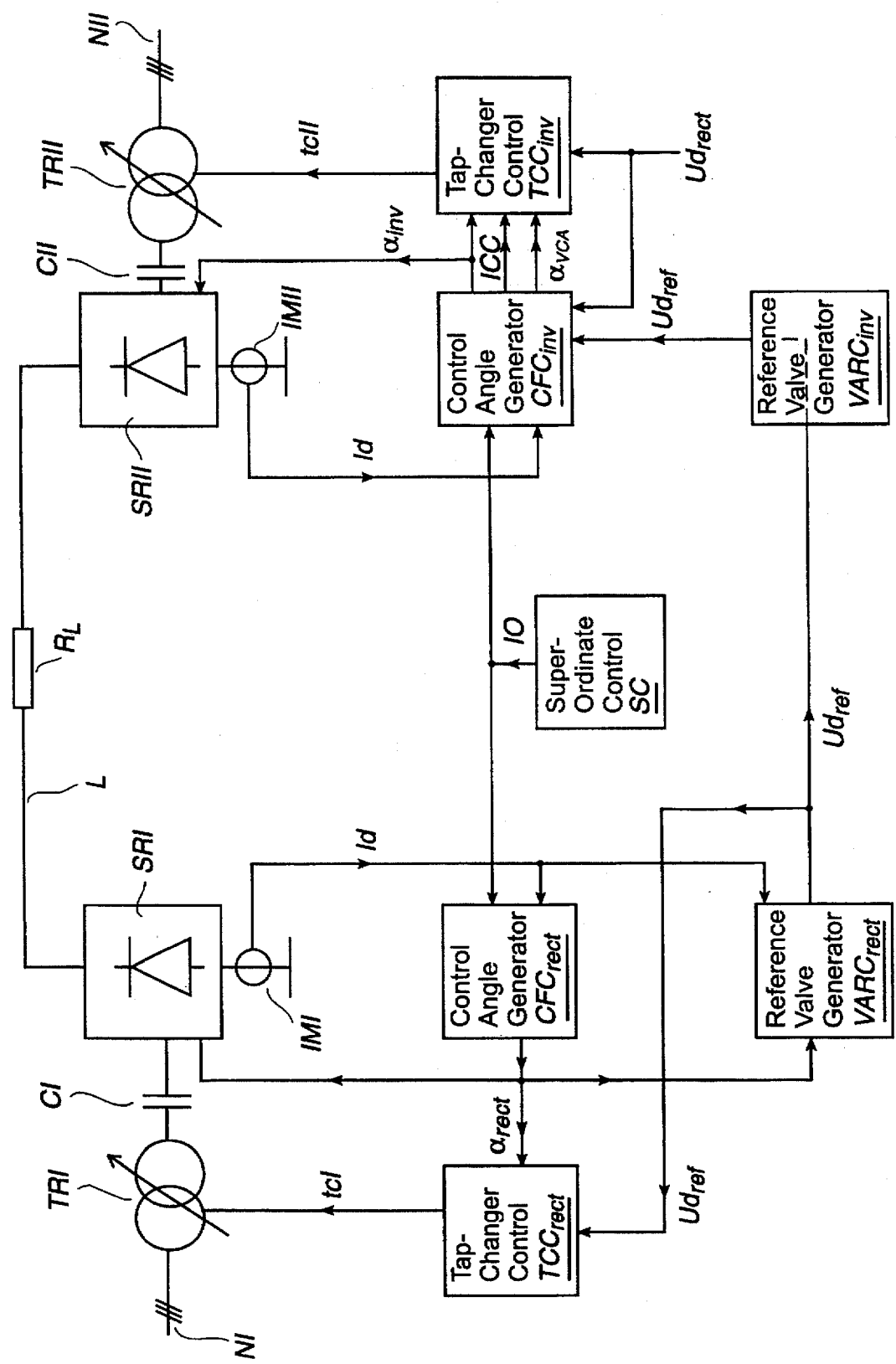
FIG. 2b shows a corresponding overall diagram for an alternative embodiment, where the inverter has a voltage controller and where the control-angle variation of the rectifier is limited by giving an increment to the voltage reference of the controller.

FIG. 2b shows an alternative embodiment of an installation according to the invention, in which the inverter has a voltage controller and in which the control-angle variation of the rectifier is limited by supplying an increment—negative or positive—to the voltage reference of the controller. Apart from the composition of some of the control units of the installation and the signals exchanged therebetween, the installation corresponds to the one shown in FIG. 2a.

Figure 3:
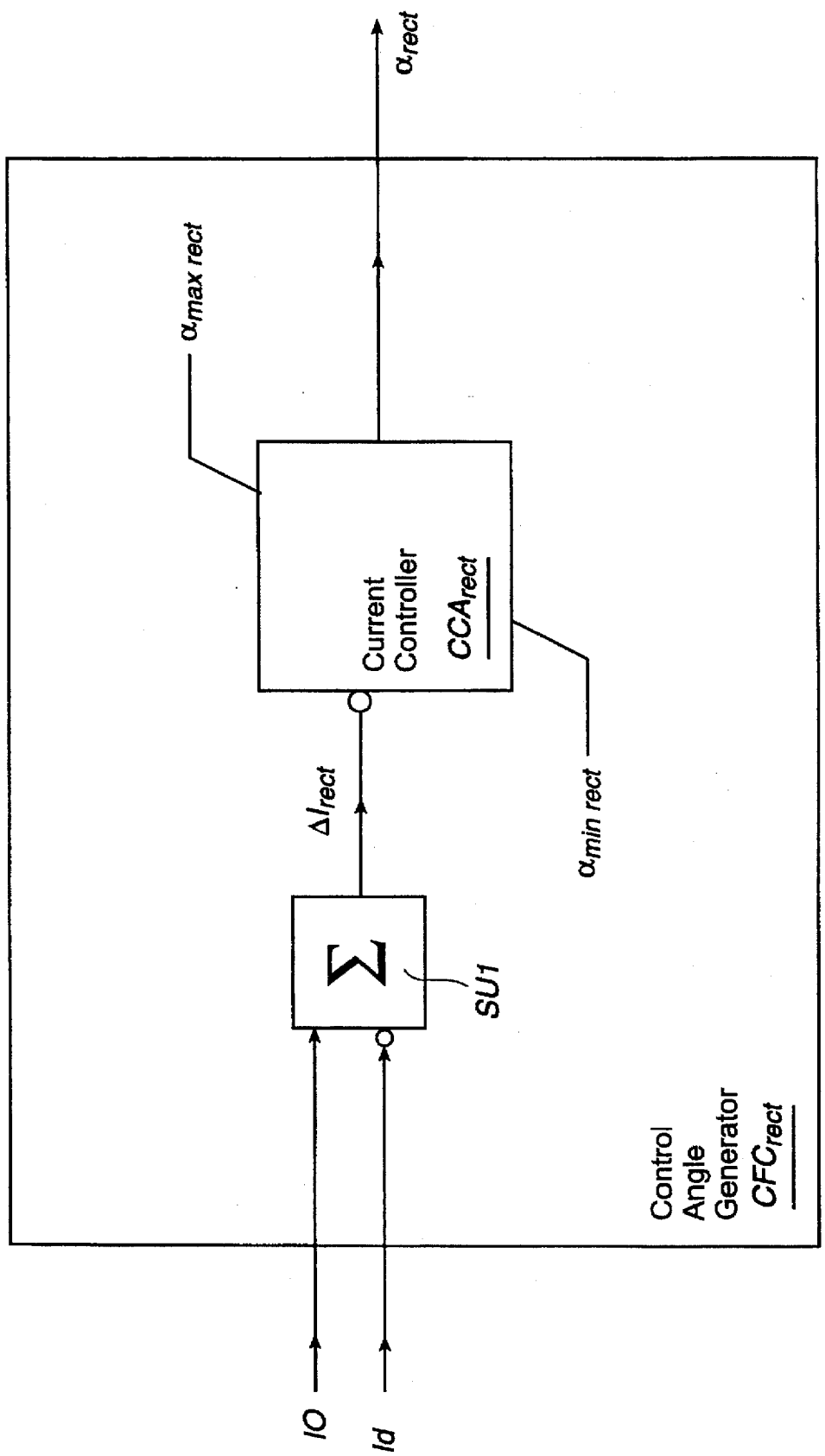

FIG. 3 shows the control-angle generator $CFC_{rect}$ of the converter SRI in the installations according to FIGS. 2a and 2b. A summing unit SU1 is supplied with the current order IO and the current measurement value Id and forms the current deviation $\Delta I_{rect}$. This is supplied to a current controller $CCA_{rect}$ which, in turn, delivers a signal $\alpha_{rect}$. The signal is supplied to the converter and controls the control angle thereof. The control angle $\alpha_{arect}$ is limited upwards and downwards to the values $\alpha_{max\ rect}$ and $\alpha_{min\ rect}$. The angle $\alpha_{max\ rect}$ is the maximally allowed control angle and corresponds to the smallest allowed commutating margin. It is defined in the same way as the maximum control angle $\alpha_{max\ inv}$ for the inverter, defined by the circuit UAL in FIG. 6a (see description of FIG. 6a below). The limitation $\alpha_{min\ rect}$ ensures adequate firing voltage for the valves and that the control angle is not reduced below the point where maximum direct voltage is obtained.

The control angle $\alpha_{rect}$ of the rectifier will be influenced—under otherwise constant conditions—by the voltage in the network NI and by operations of the tap changer of the rectifier. An increase of the line voltage or a corresponding tap-changer operation tends to give an increase of the direct voltage of the rectifier and hence an increase of the direct current. The current controller of the rectifier will then increase the control angle to attempt to maintain the direct current at the current reference. In a corresponding way, a reduction of the line voltage or a corresponding tap-changer operation causes a reduction of the control angle of the rectifier.

Figure 4A:
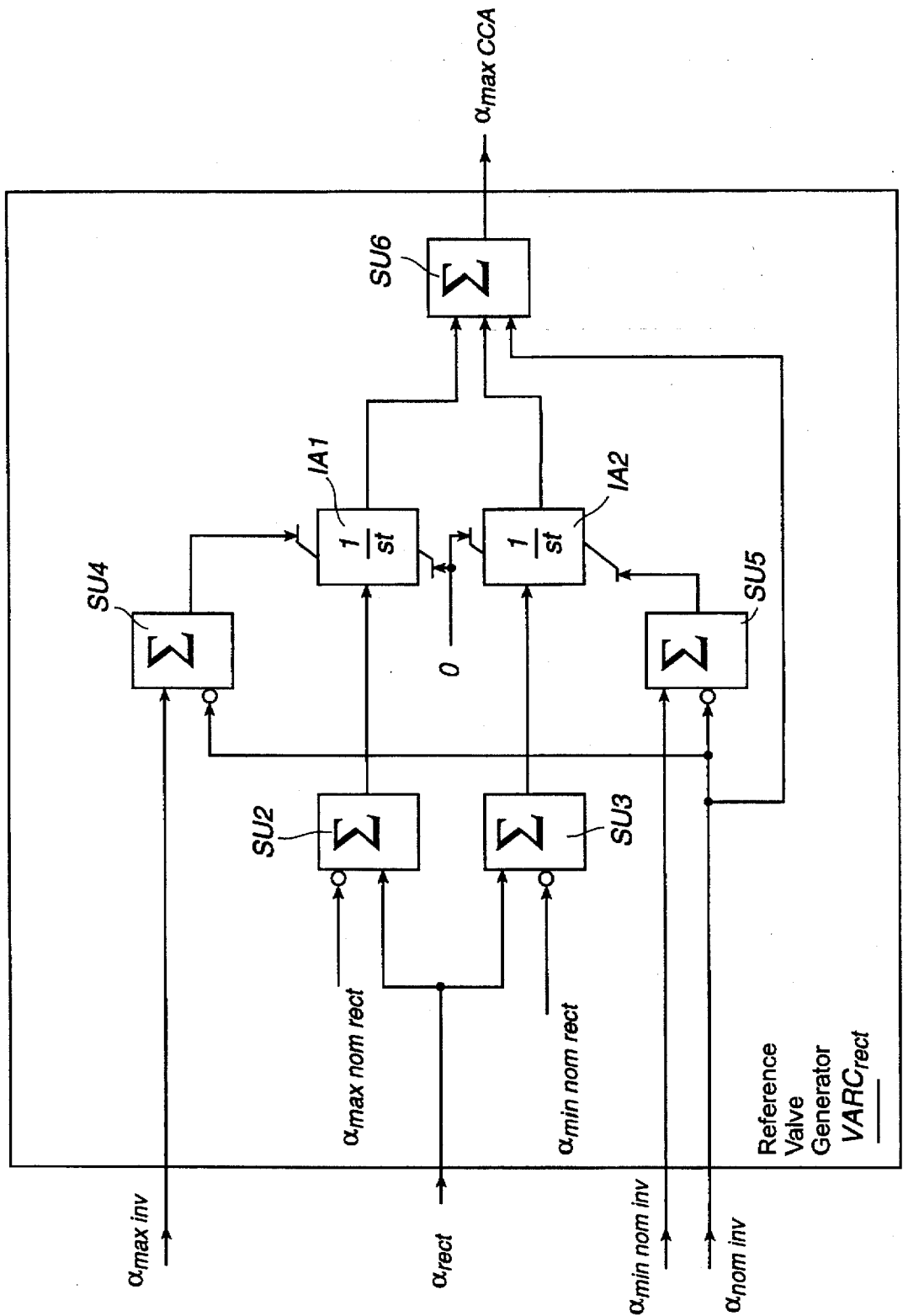

FIG. 4a shows the reference-value generator $VARC_{rect}$ in the installation according to FIG. 2a. It is supplied with the control angle $\alpha_{rect}$ of the rectifier and delivers a signal $\alpha_{max}$ CCA via the reference-value generator $VARC_{inv}$ of the inverter to the control-angle generator $CFC_{inv}$ and the tap-changer control device $TCC_{inv}$ of the inverter. In the summators SU2 and SU3, $\alpha_{rect}$ is compared with the upper and lower limit values $\alpha_{max\ nom\ rect}$ and $\alpha_{min\ nom\ rect}$ which define that interval within which it is desired to maintain the control angle under steady-state conditions.

The reference value $\alpha_{max\ nom\ rect}$ is that control angle which gives a direct voltage Ud which corresponds to a reduction of 0.5 tap-changer steps below nominal direct voltage at the control angle $\alpha_{nom\ rect}$. In a corresponding way, the reference value $\alpha_{min\ nom\ rect}$ is that control angle which gives a direct voltage Ud which corresponds to an increase of 0.5 tap-changer steps above the nominal direct voltage at the control angle $\alpha_{nom\ rect}$.

The output signals of the summing unit are supplied to integrators IA1 and IA2, the output signals of which are supplied to a summator SU6 together with a value $\alpha_{nom\ inv}$ which denotes the nominal control angle of the inverter (see the description of FIG. 6a below for definition of the control angle $\alpha_{nom\ inv}$).

The output signal of the integrator IA1 is limited upwards to a value determined by the output signal from a summator SU4 and downwards to the value zero. The output signal of the integrator IA2 is limited upwards to zero and downwards to a value determined by the output signal from a summator SU5.

The summator SU4 is supplied with a quantity $\alpha_{max\ inv}$, which denotes the upper limit to the dynamic operating range of the inverter, and with the quantity $\alpha_{nom\ inv}$. The upper limit to the output signal of the integrator IA1 thus becomes equal to the difference between the upper limit $\alpha_{max\ inv}$ of the control angle and the nominal control angle $\alpha_{nom\ inv}$.

The summator SU5 is supplied with a quantity $\alpha_{min\ nov\ inv}$, which denotes the lower limit to the steady-state operating range of the inverter, and with the quantity $\alpha_{nom\ inv}$. The lower limit to the output signal of the integrator IA2 thus becomes equal to the difference between the nominal control angle $\alpha_{nom\ inv}$ and the lower limit $\alpha_{max\ inv}$ of the control angle.

The quantities $\alpha_{nom\ inv}$, $\alpha_{min\ inv}$ and $\alpha_{max\ inv}$ are supplied to the reference-value generator of the rectifier from the control-angle generator $CFC_{inv}$ of the inverter.

Normally, the control angle of the rectifier will be within the nominal range determined by the values $\alpha_{max\ nom\ rect}$ and $\alpha_{min\ nom\ rect}$. The output signal from the summator SU2 is negative and that from the summator SU3 positive, the output signals from the integrators are zero, and the output signal $\alpha_{max\ CCA}$ of the reference-value generator has the nominal value $\alpha_{nom\ inv}$. If the control signal of the rectifier, for example, because of a voltage change in the network NI, or because of a tap-changer operation, increases such that it arrives above the upper limit for the nominal range, the output signal of the integrator IA1 will become positive and increasing. It provides an increment to the signal $\alpha_{max\ CCA}$, which (as will be shown below with reference to FIG. 6a) entails an increase of the control angle of the inverter and hence an increase of the direct voltage of the transmission and, in turn, a limitation of the control-angle change of the rectifier. In a corresponding way, if the control angle of the rectifier arrives below the lower limit of the nominal range, the output signal of the integrator IA2 will be negative and increasing, which entails a negative increment to the control angle of the inverter, a reduction of the direct voltage of the transmission, and hence a limitation of the control-angle change of the rectifier.

In the manner described, the control angle of the rectifier will—except during dynamic states—be maintained within the predetermined nominal range.

Figure 4B:
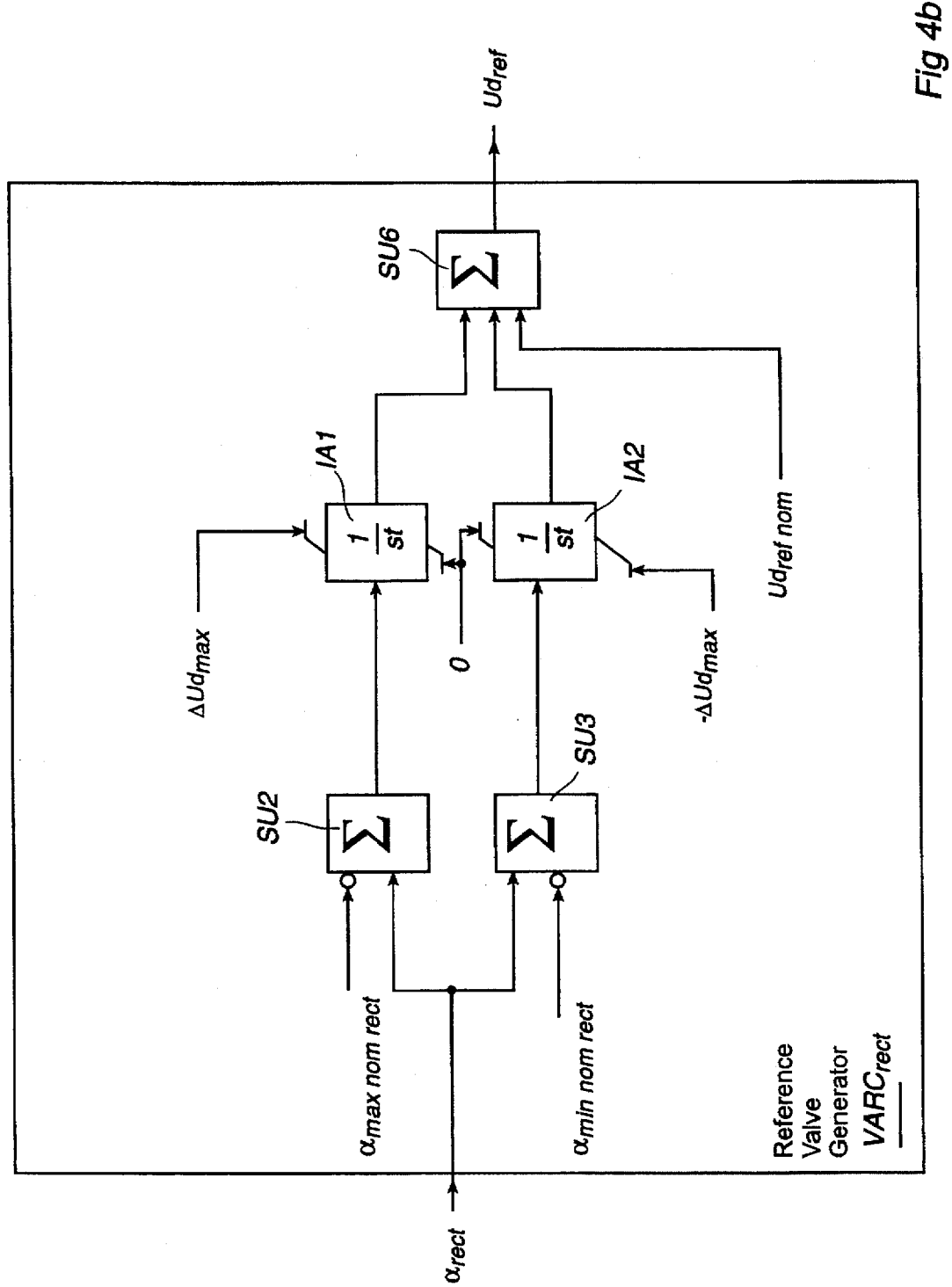
FIGS. 4b and 4c show two alternative embodiments of the reference-value generator in the installation according to FIG. 2b.

FIG. 4b shows how the reference-value generator $VARC_{rect}$ is designed in the installation shown in FIG. 2b. The generator is supplied with the control angle $\alpha_{rect}$ of the rectifier and delivers a direct-voltage reference $Ud_{ref}$ via the reference-value generator $VARC_{inv}$ of the inverter to a voltage controller arranged in the control-angle generator $CFC_{inv}$ of the inverter. The generator is built up and functions, in principle, in the same way as the generator described above with reference to FIG. 4a. However, the summing unit SU6 is here supplied with a value $Ud_{ref\ nom}$, which constitutes a reference value for the nominal direct voltage of the transmission at the rectifier end.

The output signals of the integrators are limited to values between zero and $\pm \Delta Ud_{max}$. With the definition of the reference values $\alpha_{max\ nom\ rect}$ and $\alpha_{min\ nom\ rect}$ given above, the limiting value $\Delta Ud_{max}$ should be set at a value which constitutes the change of the direct voltage which corresponds to 0.5 tap-changer steps.

In the normal case, that is, if the control angle of the rectifier lies within its nominal range, the output signals of the integrators are zero, the output signal $Ud_{ref}$ has the value $Ud_{ref\,nom}$ and the voltage of the transmission is controlled by the voltage controller of the inverter to this value. In the same way as described above, if the control angle of the rectifier tends to go beyond the nominal range, one of the integrators will give a (positive or negative) increment to the value $Ud_{ref\,nom}$. This entails such a change of the direct voltage of the transmission that the control-angle change of the rectifier will be limited and the steady-state value of the control angle will be maintained within the nominal range.

Figure 4C:
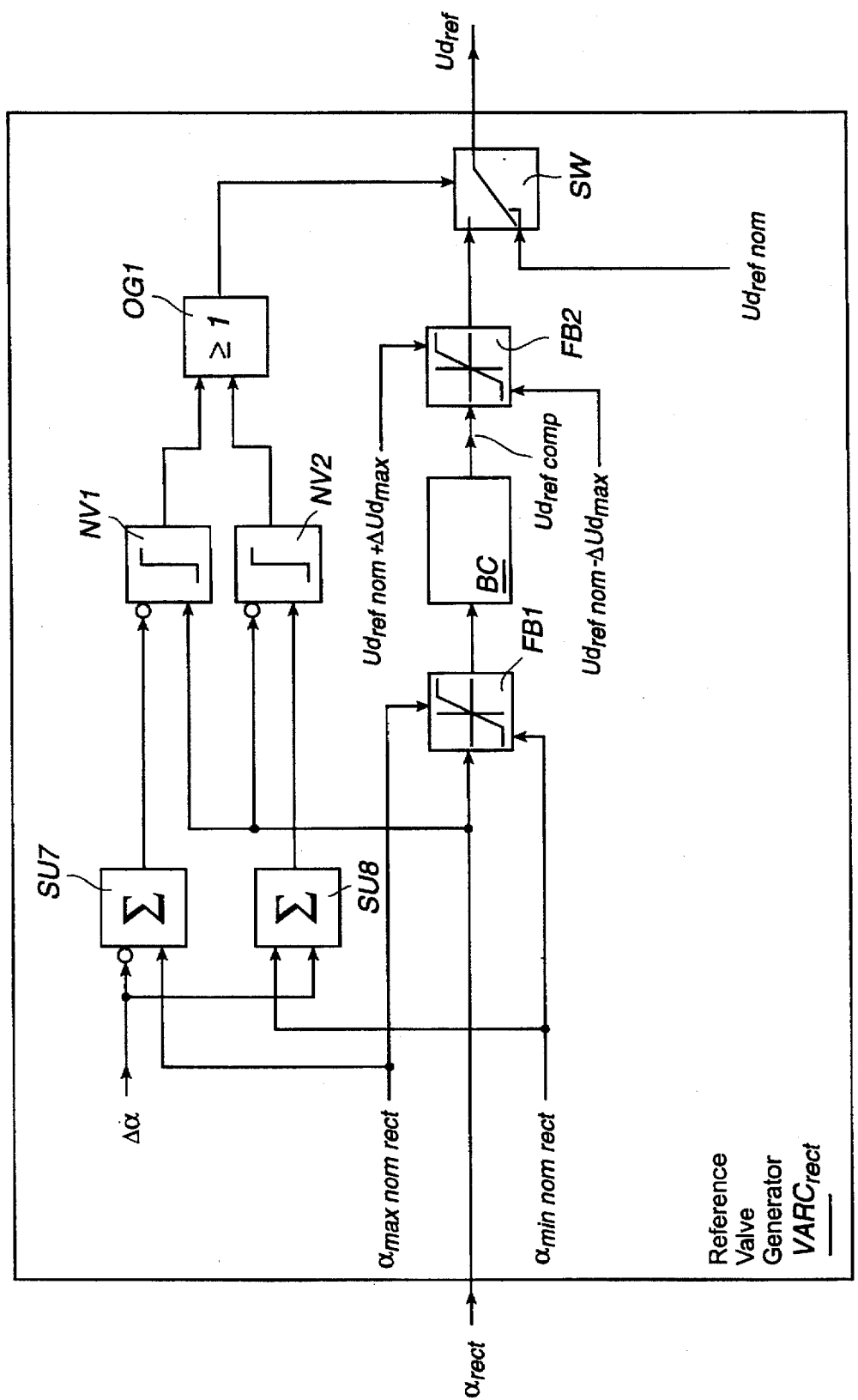

FIG. 4c shows an alternative embodiment of the reference-value generator $VARC_{rect}$ in the installation according to FIG. 2b. Like the circuit shown in FIG. 4b, it is supplied with the control angle $\alpha_{rect}$ of the rectifier and delivers a direct-voltage reference $Ud_{ref}$. The summators SU7 and SU8 are supplied with the control angle $\alpha_{rect}$ of the rectifier as well as with a constant signal $\Delta\alpha$ which corresponds to a small angle, and which may typically correspond to the angle 1°. In the summators the limit values $\alpha_{max\,nom\,rect}-\Delta\alpha$ and $\alpha_{min\,nom\,rect}+\Delta\alpha$ are formed, which in the level flip-flops NV1 and NV2 are compared with $\alpha_{rect}$. If $\alpha_{rect}$ becomes greater than the upper or lower than the lower of the limit values, a control signal is obtained and delivered via an OR circuit OG1 to a switch SW, which then connects the output of the reference-value generator to the output signal from a calculating circuit BC, which output signal is limited in a limiting circuit FB2. When $\alpha_{rect}$ lies between the two stated limit values, the switch is in the position shown in the figure, in which case $Ud_{ref}=Ud_{ref\,nom}$.

The control signal $\alpha_{rect}$ of the rectifier is limited in a limiter FB1 to the steady-state, nominal control-angle interval with the limits $\alpha_{max\,nom\,rect}$ and $\alpha_{min\,nom\,rect}$. The limited control angle is supplied to the calculating circuit BC. In addition, the calculating circuit is supplied with the maximum no-load voltage $U_{di0}$ of the rectifier and with the direct current Id. From the known main circuit equation of the rectifier, the circuit calculates $$Ud = f(U_{di0}, Id, \alpha_{rect})$$

that is, that value of the direct voltage which corresponds to the control angle ($\alpha_{rect}$), supplied to the circuit, under the current operating conditions ($U_{di0}$, Id). The output signal of the calculating circuit is designated $Ud_{ref\,comp}$ and is supplied to the limiting circuit FB2, where the signal is limited upwards to the value $Ud_{ref\,nom}+\Delta Ud_{max}$ and downwards to the value $Ud_{ref\,nom}-\Delta Ud_{max}$ (for definition of these quantities, see the description of FIG. 4b above).

The function of the reference-value generator shown in FIG. 4c corresponds in all essentials to the function described above with reference to FIG. 4b. If the control angle $\alpha_{rect}$ of the rectifier reaches any of the limits to the interval determined by the summators SU7 and SU8, the switch SW will become activated. The calculating circuit calculates that direct-voltage value which corresponds to the limited control angle obtained from the limiter FB1, and this value is forwarded by the switch as the voltage reference $Ud_{ref}$. This means a change of the direct voltage Ud of the transmission to such a value that the control angle does not exceed the value $\alpha_{max\,nom\,rect}$ or fall below the value $\alpha_{min\,nom\,rect}$. As soon as the control angle $\alpha_{rect}$ returns to the interval determined by the summators SU7 and SU8, the switch SW is reset, and the voltage reference $Ud_{ref}$ returns to the value $Ud_{ref\,nom}$.

The reference-value generator shown in FIG. 4c has one feedback loop less than the generator according to FIG. 4b but requires a higher calculating capacity for solution of the main circuit equation of the converter.

Figure 5A:
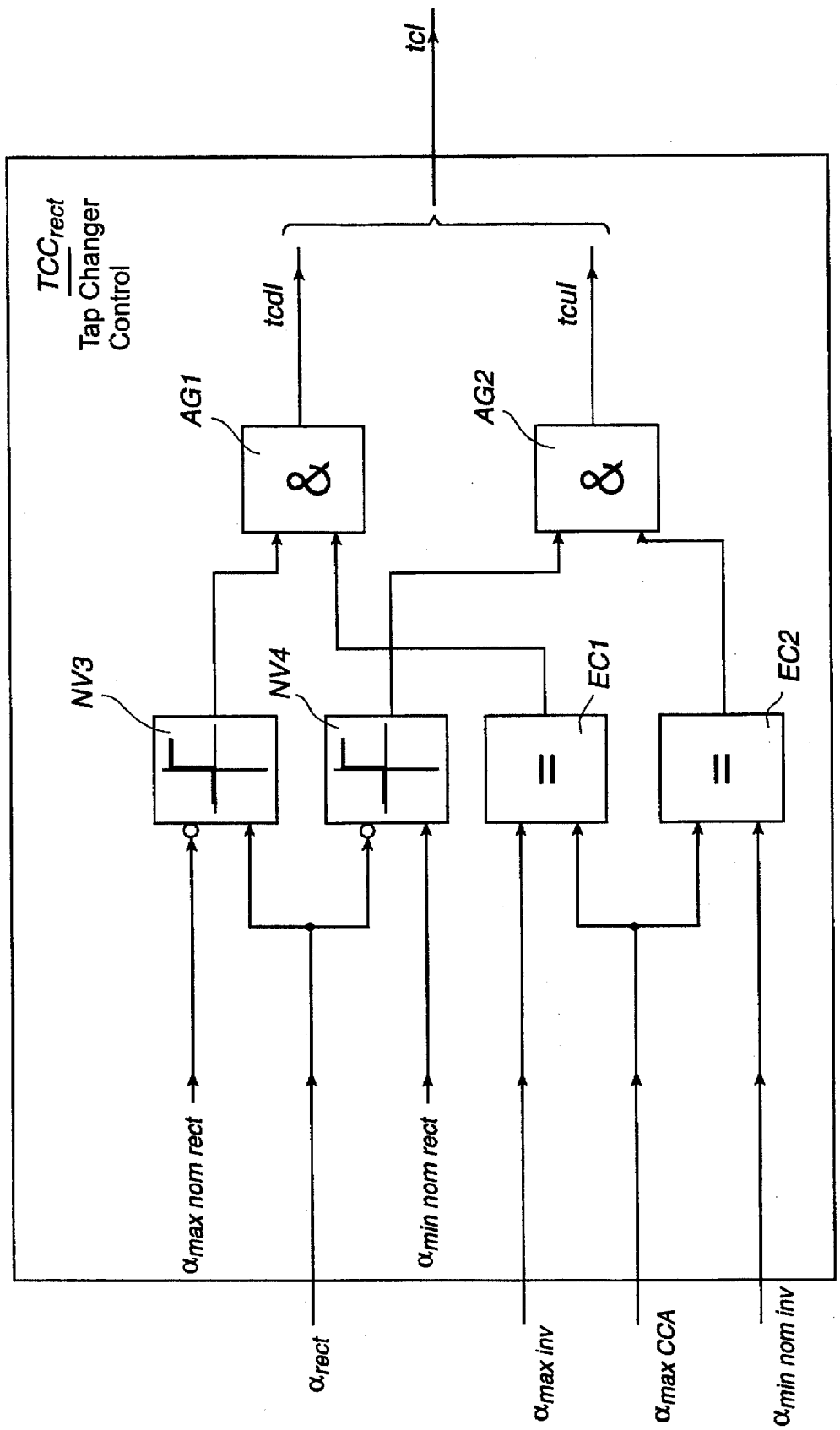
FIG. 5a shows the control device for the tap changer of the rectifier in the installation according to FIG. 2a, and FIG. 5b shows the same control device in the installation according to FIG. 2b.

FIG. 5a shows the tap-changer control device $TCC_{rect}$ in the installation shown in FIG. 2a. The control device is supplied with the control angle $\alpha_{rect}$ of the rectifier and with the signals $\alpha_{max\,CCA}$, $\alpha_{max\,inv}$ and $\alpha_{min\,nom\,inv}$. In level flip-flops NV3 and NV4, $\alpha_{rect}$ is compared with the limits $\alpha_{max\,nom\,rect}$ and $\alpha_{min\,nom\,rect}$, respectively, for that interval within which it is desired to maintain the control angle under steady-state conditions. If $\alpha_{rect}$ rises to the value $\alpha_{max\,nom\,rect}$, a positive output signal is obtained from the circuit NV3, and if $\alpha_{rect}$ drops to the value $\alpha_{min\,nom\,rect}$, a positive output signal is obtained from the circuit NV4. In the circuits EC1 and EC2, the signal $\alpha_{max\,CCA}$ is compared with the control-angle limits $\alpha_{max\,inv}$ and $\alpha_{min\,nom\,inv}$, which correspond to nominal direct voltage ±0.5 tap-changer steps. If both $$\alpha_{max\,CCA} = \alpha_{max\,inv}$$

and $$\alpha_{rect} \geq \alpha_{min\,nom\,rect}$$

an AND circuit AG1 delivers a voltage reduction signal tcdI to the tap changer of the transformer TRI which is thus stepped down one step. If both $$\alpha_{max\,CCA} = \alpha_{min\,nom\,inv}$$

and $$\alpha_{rect} \leq \alpha_{min\,nom\,rect}$$

an AND circuit AG2 delivers a voltage increase signal tcuI to the tap changer of the transformer TRI which is thus stepped up one step.

The two control signals to the tap changer are in FIGS. 2a and 5a commonly designated signal tcI.

The steps of the tap changer are adapted such that one step gives a voltage change of a suitable magnitude. A typical value of the voltage change per step is 1.25% of the nominal voltage.

The function of the tap-changer control device is thus such that stepping is ordered when the control angle goes beyond the predetermined interval on condition that the scope for variation of the control angle of the inverter is fully utilized.

Figure 5B:
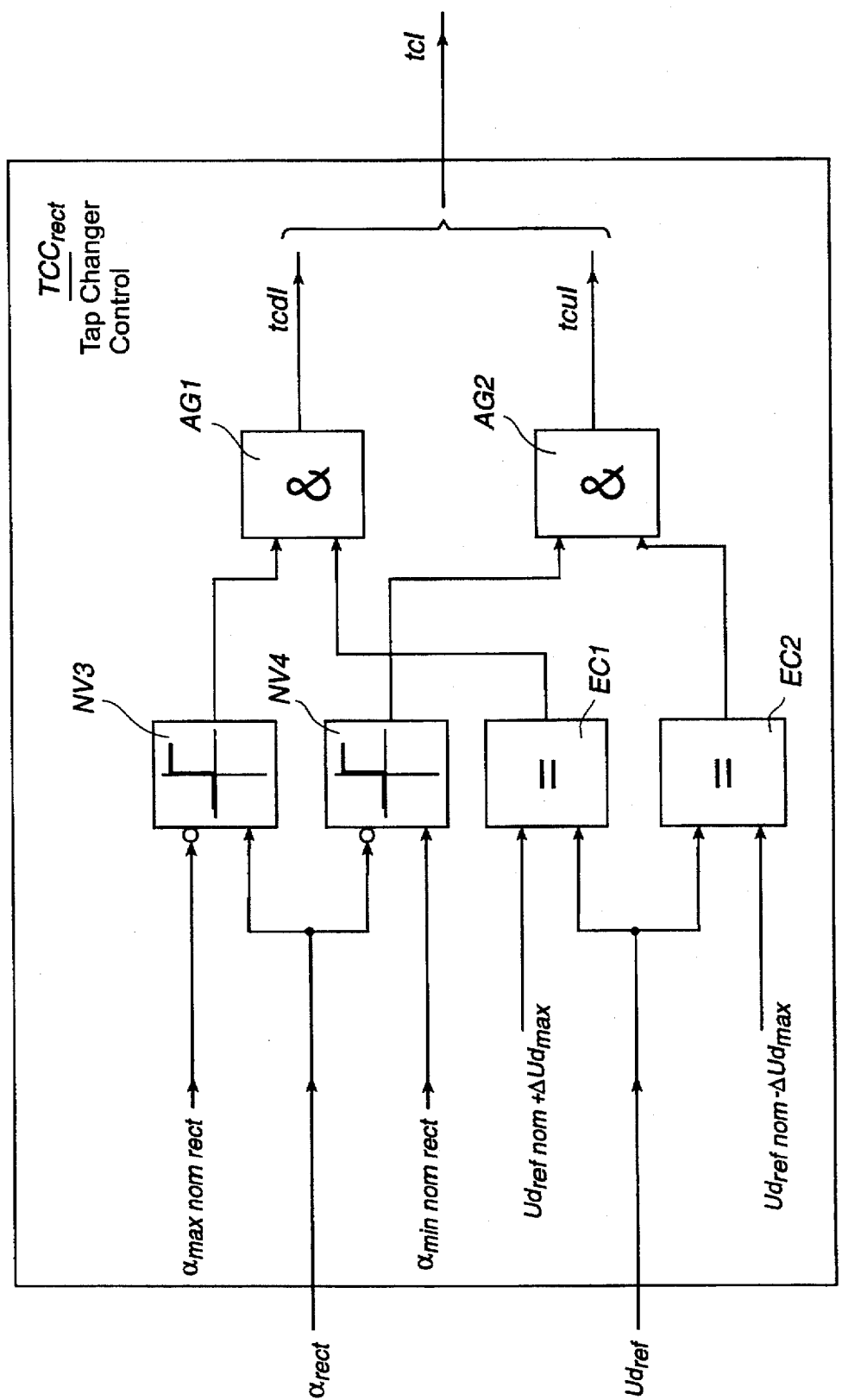

FIG. 5b shows the tap-changer control device $TCC_{rect}$ in the installation shown in FIG. 2b. The control device is supplied with the control angle $\alpha_{rect}$ of the rectifier and the voltage reference $Ud_{ref}$. In level flip-flops NV3 and NV4, $\alpha_{rect}$ is compared with the limits $\alpha_{max\,nom\,rect}$ and $\alpha_{min\,nom\,rect}$, respectively, for that interval within which it is desired to maintain the control angle under steady-state conditions. If $\alpha_{rect}$ rises to the value $\alpha_{max\,nom\,rect}$, a positive output signal is obtained from the circuit NV3, and if $\alpha_{rect}$ drops to the value $\alpha_{min\,nom\,rect}$, a positive output signal is obtained from the circuit NV4. In the circuits EC1 and EC2, the voltage reference $Ud_{ref}$ is compared with the values $Ud_{ref\,nom}\pm\Delta Ud_{max}$, which correspond to the nominal direct voltage ±0.5 tap-changer steps. If both $$Ud_{ref} = U_{dref\,nom} + \Delta Ud_{max}$$

and $$\alpha_{rect} \geq \alpha_{max\,nom\,rect}$$

an AND circuit AG1 delivers a voltage reduction signal tcdI to the tap changer of the transformer TRI which is thus stepped down one step. If both $$Ud_{ref} = U_{dref\ nom} - \Delta Ud_{max},$$

and $$\alpha_{rect} \leq \alpha_{min\ nom\ rect}$$

an AND circuit AG2 delivers a voltage increase signal tcuI to the tap changer of the transformer TRI which is thus stepped up one step.

The two control signals to the tap changer are in FIGS. 2b and 5b commonly designated signal tcI.

The steps of the tap changer are adapted such that one step gives a voltage change of a suitable magnitude. A typical value of the voltage change per step is 1.25% of the nominal voltage.

The function of the tap-changer control device is thus such that stepping is ordered when the control angle goes beyond the predetermined interval on condition that the control scope of the voltage reference is fully utilized.

Figure 6A:
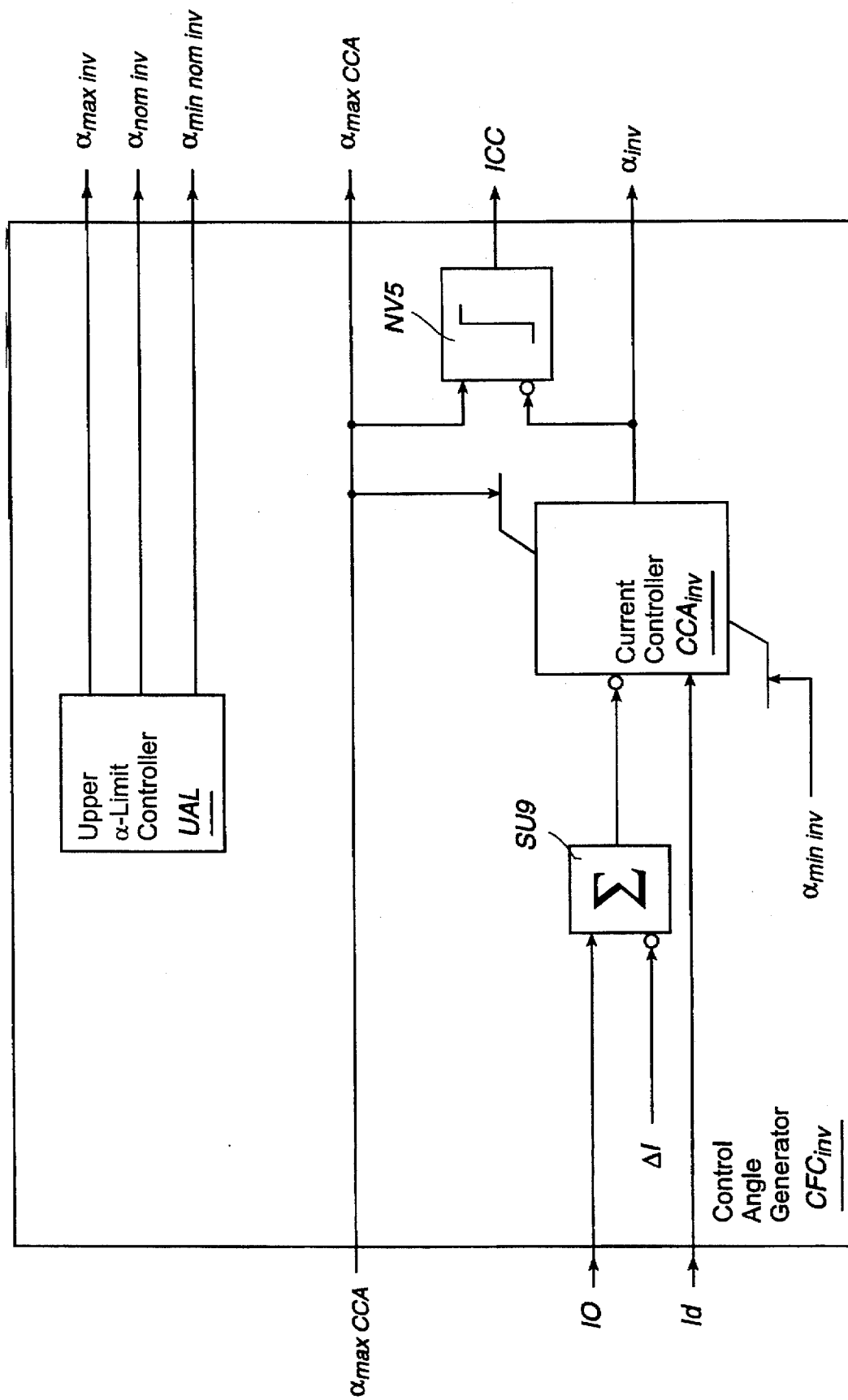
FIG. 6a shows the control-angle generator of the inverter in the installation according to FIG. 2a, and FIG. 6b the control-angle generator in the installation according to FIG. 2b.

FIG. 6a shows the embodiment of the control-angle generator $CFC_{inv}$ of the inverter in that embodiment according to FIG. 2a where the control angle of the inverter is given an increment for changing the direct voltage. The control-angle generator has a current controller $CCA_{inv}$, a summator SU9 and a level flip-flop NV5.

The current order I0 is supplied to the summator SU9, in which, in a known manner, a current margin $\Delta I$ is subtracted from the current order. The actual current Id will therefore, as long as the rectifier is current-controlling, be greater than the resultant current order I0-$\Delta I$, and the output signal $\alpha_{inv}$ of the current controller is driven to its upper limit value. This is controlled by the signal $\alpha_{max\ CCA}$ received from the reference-value generator $VARC_{rect}$ of the rectifier. The output signal of the current controller is limited downwards to the value $\alpha_{min\ inv}$, which typically has a value just above 90° to prevent the inverter from dynamically changing to rectifier operation.

The output signal $\alpha_{inv}$ of the current controller is supplied to the inverter SRII and determines the control angle thereof.

The output signal ICC from the level flip-flop NV5 is "0" as long as the rectifier is current-controlling and therefore $\alpha_{inv}$ is at the upper limit value $\alpha_{max\ CCA}$. If the inverter were temporarily to change into being current-controlling, its control angle $\alpha_{inv}$ would generally fall below the upper limit value $\alpha_{max\ CCA}$ and the signal ICC would become "1", which indicates that the inverter is current-controlling.

The quantities $\alpha_{max\ inv}$, $\alpha_{min\ nom\ inv}$ and $\alpha_{nom\ inv}$ are given by a circuit UAL.

The circuit UAL determines the upper limit value $\alpha_{max\ inv}$ for the control angle of the inverter according to two criteria. On the one hand, in a known manner, that control angle, at which a certain predetermined commutating margin is obtained, must not be exceeded. On the other hand, that control angle, at which the (negative) direct voltage of the inverter no longer increases with increasing control angle, should not be exceeded since otherwise the voltage control could have two possible operating points.

The lower limit value $\alpha_{min\ nom\ inv}$ is that control angle which gives a reduction of the inverter direct voltage corresponding to one tap-changer step relative to the direct voltage which is obtained at $\alpha_{inv} = \alpha_{max\ inv}$.

The nominal operating point of the inverter is that control angle $\alpha_{nom\ inv}$ at which an inverter voltage is obtained which is 0.5 tap-changer steps below the voltage at $\alpha_{inv} = \alpha_{max\ inv}$.

Figure 6B:
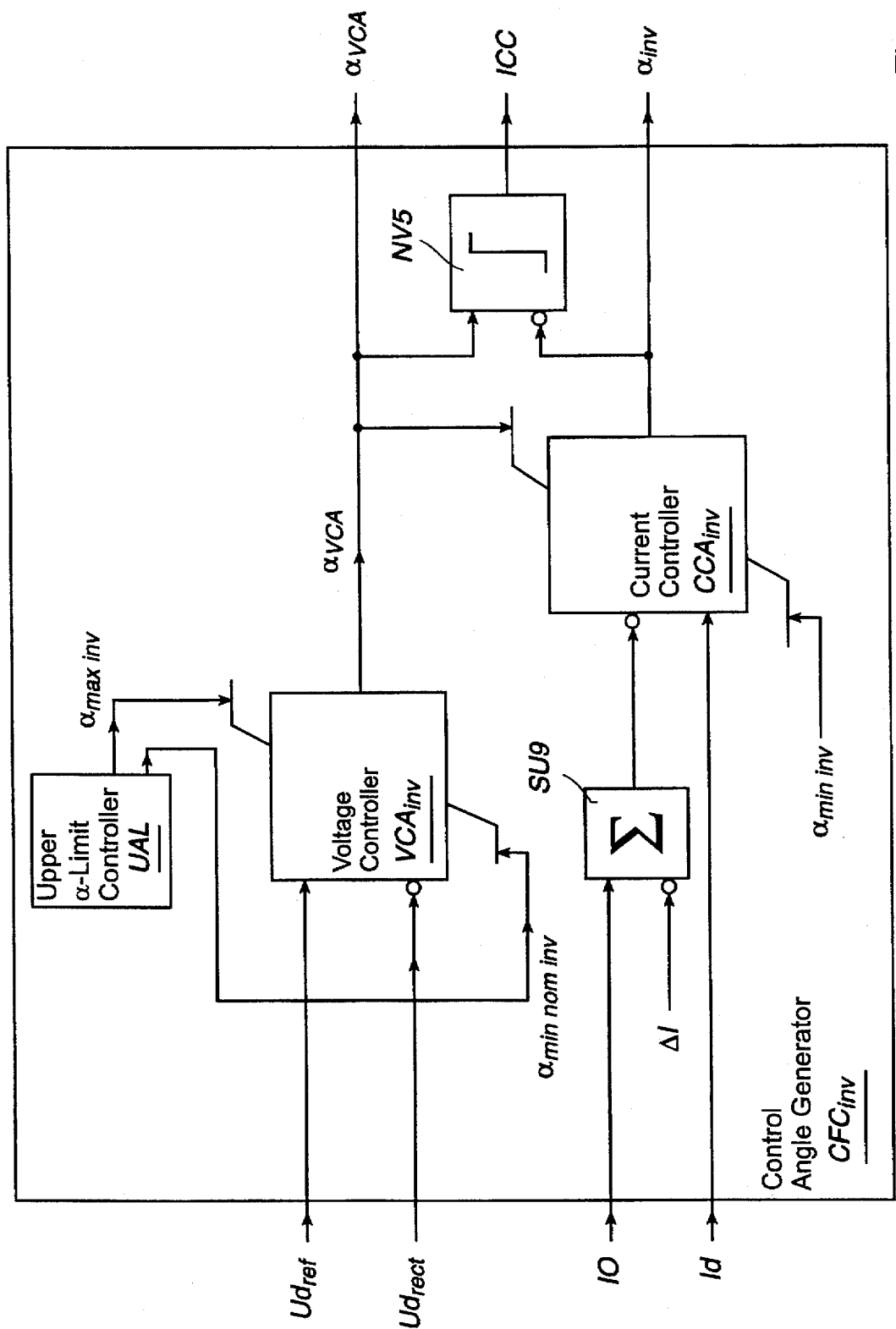

FIG. 6b shows the control-angle generator $CFC_{inv}$ of the inverter in the case where it has a voltage controller and the direct voltage of the transmission is influenced by control of the voltage reference of the controller. The voltage controller $VCA_{inv}$ is supplied with the voltage reference $Ud_{ref}$ from the reference-value generator $VARC_{rect}$ of the rectifier and with a measured value $Ud_{rect}$ of the direct voltage of the rectifier. It delivers the output signal $\alpha_{VCA}$ to the current controller $CCA_{inv}$ and to the control device $TCC_{inv}$ for the tap changer of the inverter transformer.

The output signal $\alpha_{inv}$ of the current controller is driven—when the rectifier is current-controlling—to its upper limit value. This is controlled by the voltage controller $VCA_{inv}$ to the value $\alpha_{VCA}$. The output signal of the voltage controller is limited upwards to the value $\alpha_{max\ inv}$ and downwards to the value $\alpha_{min\ nom\ inv}$. These values are obtained, as mentioned above with reference to FIG. 6a, from a circuit UAL.

As mentioned above, the input signals to the voltage controller consist, on the one hand, of the voltage reference $Ud_{ref}$ and, on the other, of a measured value of the direct voltage $Ud_{rect}$ of the transmission. Both the reference value and the measured value relate to the voltage at the rectifier side of the transmission and are transmitted from there via a telecommunications link. The measured value may alternatively be formed in the control equipment of the inverter by adding to the inverter direct voltage the product of the direct current and the known resistance of the line.

FIG. 7a shows the control unit $TCC_{inv}$ for the tap changer of the inverter in the embodiment where the control angle of the inverter is given an increment for changing the direct voltage. The direct voltage $Ud_{rect}$ of the transmission is supplied to the level flip-flops NV6 and NV7 together with the reference values $Ud_{max\ a}$ and $Ud_{min\ a}$, which correspond to the nominal direct voltage ±1.0 tap-changer step. From NV6 a signal is obtained for stepping down the tap changer if $$Ud_{rect} > Ud_{max\ a},$$

and from NV7 a signal is obtained for stepping up the tap changer if $$Ud_{rect} < Ud_{min\ a}.$$

These signals are supplied to the tap changer via AND circuits AG3 and AG4 and the step-down signal, in addition, via an OR circuit OG2. The resultant step-down signal is designated tcdII and the resultant step-up signal is designated tcuII, and the two signals are denoted by the common designation tcII.

If the inverter has temporarily taken over the current control, the signal ICC becomes "1", whereby the AND circuits AG3 and AG4 block the tap-changer operation. To ensure, in this operating case, that the inverter does not operate with too low a control angle, an unconditional step-down signal is further given with the aid of the level flip-flop NV8 or the AND circuit OG2 if $\alpha_{inv} < \alpha_{min\ nom\ inv}$.

FIG. 7b shows the control unit $TCC_{inv}$ for the tap changer of the inverter in the embodiment used in the case where the inverter has a voltage controller and the direct voltage of the transmission is influenced by control of the voltage reference of the controller.

Since the above-described control of the direct voltage with the aid of the voltage reference $Ud_{ref}$ will vary the direct voltage within the interval between $Ud_{min\ b}$ and $Ud_{max\ b}$, which correspond to nominal voltage ±0.5 tap-changer steps, the equipment must be able to distinguish between, on the one hand, these voltage variations caused by the rectifier and, on the other hand, such voltage variations as are caused by voltage changes in the alternating-voltage network of the inverter. This is achieved with the aid of comparison circuits EC3 and EC4, a level flip-flop NV8 and the gates AG3, AG4 and OG2 mentioned above.

The circuits EC3 and EC4, respectively, deliver a "1" signal if the quantity $\alpha_{VCA}$ is at either of the limits $\alpha_{max\ inv}$ or $\alpha_{min\ nom\ inv}$. The control angle of the inverter—if the inverter is current-controlling—is equal to the quantity $\alpha_{VCA}$. This means that the inverter voltage controller $VCA_{inv}$ alone will counteract deviations in the direct voltage as long as the signal $\alpha_{VCA}$, and hence the control angle, lies between the limit values mentioned above. Only if the control possibilities of the voltage controller are exhausted, which is indicated by a "1" signal from either of the circuits EC3 and EC4, will an operating signal to the tap changer be delivered.

In the foregoing, a number of embodiments of the invention are described, but, of course, the invention is not limited to these embodiments.

The result of a control method according to the invention is that in case of variations in the $U_{di0}$ of the rectifier or the inverter of up to ±1 tap-changer step, the control angle of the rectifier will be maintained between the limits $\alpha_{max\ nom\ rect}$ and $\alpha_{min\ nom\ rect}$. Further, the control angle of the inverter will be maintained between the limits $\alpha_{max\ inv}$ and $\alpha_{min\ nom\ inv}$. In both cases, this gives a maximum control-angle variation corresponding to ±0.5 tap-changer steps. This limitation of the control-angle variations is achieved by controlling the direct voltage of the transmission in the way described above. The maximum control-angle variation is thus approximately halved compared with prior art installations and control methods. This entails a corresponding reduction of the variations in the reactive-power consumption of both the rectifier and the inverter. The changes of the reactive-power consumption will be distributed equally between the rectifier and the inverter.

Larger changes of the $U_{di0}$ of the rectifier than what corresponds to ±1 tap-changer step will cause the control angle of the rectifier to go outside the predetermined range and hence cause a movement of the tap-changer and therefore a restoration of the control angle and the direct voltage to the nominal values.

To avoid possible instabilities in the tap-changer control, it may be advantageous to synchronize the tap-changer stepping between the two stations (converters) of the transmission such that, when ordering stepping in one station, a stepping in the other is delayed until the stepping has been carried out in the former station.

The above-described approximate halving of the maximum amplitude of the line-voltage variations has been achieved with an unchanged magnitude of the steps of the tap-changers and hence without any increase at all of the operating frequency and wear of the tap changers.

The above description relates to an installation arranged for power transmission between two alternating-voltage networks. However, the invention may also be applied to so-called multistation transmissions, that is, installations where three or more alternating-voltage networks are connected to each other with the aid of converters and a common direct-voltage connection.

Alternatively, the rectifier may be voltage-controlling and the inverter current-controlling. Also in this case, according to the invention, it is the current-controlling converter—in this case the inverter—whose control-angle variations are reduced by causing the voltage-controlling converter to change the direct voltage of the transmission in such a way that the above-mentioned control-angle variations are counteracted.

In the embodiment described above, the limit values in the control equipment are chosen such that the control-angle changes and hence the reactive-power changes are distributed equally between the current-controlling and the voltage-controlling converter. This distribution may be suitable if the two power networks are approximately of even strength. If one of the networks is strong and the other weak, the former withstands higher reactive-power variations for a certain given level of the voltage variations. It may then be suitable to control the transmission such that the strong network is allotted a larger part and the weak network a smaller part of the control-angle variations. This may be achieved by a suitable choice of limit values in the control equipment.

We claim:

1. An installation for transmission of electric power by means of high voltage direct current, comprising;

a first phase angle controlled converter connected to a first alternating voltage network;

a d.c. connection;

a second phase angle controlled converter connected to a second alternating voltage network;

said first and second converters being connected to said d.c. connection, and said first converter controlling a current flowing in said d.c. connection and said second converter controlling a voltage on said d.c. connection;

means for sensing a control angle of said first converter; and control means connected to said means for sensing and to said first and second converters;

said control means controlling said second converter, so that upon a change in said sensed control angle such that it reaches a limit of a predetermined phase angle interval, said second converter establishes a d.c. voltage on said d.c. connection which limits said change in said sensed control angle.

2. An installation for transmission of electric power according to claim 1, wherein said control means comprises means for generating a control signal for a control angle of the voltage-controlling second converter, said control signal being dependent on the control angle of the current-controlling first converter, and means for controlling the control angle of the voltage-controlling second converter in accordance with the control signal.

3. An installation for transmission of electric power according to claim 2, in which the voltage-controlling second converter is connected to its alternating-voltage network through a transformer provided with a multiple step tap changer, and the control means further comprises means for limiting the control angle of the voltage-controlling second converter to a control-angle range which corresponds to a voltage interval which is smaller than the voltage change which corresponds to two steps of the tap-changer.

4. An installation for transmission of electric power according to claim 1, wherein said control means further comprises means, adapted in dependence on the control angle of the current-controlling first converter, for generating a reference value for the d.c. voltage of the transmission, and control-angle determining means adapted to be supplied with said reference value and to influence the control angle of the voltage-controlling second converter for control of the d.c. voltage of the transmission in accordance with the reference value.

5. An installation for transmission of electric power according to claim 4, wherein said control means further comprises means, adapted if the control angle of the first converter reaches a limit of said predetermined phase angle interval, on the basis of the main circuit equations of the first converter, for calculating the d.c. voltage value which corresponds to a control angle lying at the interval limit, and for supplying to the control-angle determining means this d.c. voltage value as a voltage reference.

6. An installation for transmission of electric power according to claim 4, in which the voltage-controlling second converter is connected to its alternating-voltage network through a transformer provided with a multistep tap changer, and the control means further comprises means for limiting the control angle of the voltage-controlling second converter to a control-angle range which corresponds to a voltage interval which is smaller than that voltage change which corresponds to two steps of the tap changer.

7. An installation for transmission of electric power according to claim 6, wherein the control means further comprises means for preventing the operation of the tap changer as long as the control angle of the voltage-controlling second converter is within said control-angle range.

8. An installation for transmission of electric power according to claim 1, wherein the current-controlling first converter is connected to its alternating-voltage network via a transformer changer, and said predetermined interval of the control angle is chosen such that a change of the control angle of the current-controlling first converter between the center of the interval and an interval limit corresponds to a change of the d.c. voltage of the first converter which is smaller than that d.c. voltage change which is caused by a change of the position of the tap-changer by one step.

9. An installation for transmission of electric power according to claim 8, wherein said control means comprises means adapted in dependence of the control angle of the current-controlling first converter, for controlling a variable of the voltage-controlling second converter within a control range defined by an upper and a lower limit, and means for preventing operating of the tap changer for as long as the variable lies within the control range.

10. An installation for transmission of electric power according to claim 1, wherein at least one of the converters is connected to its alternating-voltage network through series capacitors.

* * * * *